(12) United States Patent
Dong et al.

(10) Patent No.: US 12,520,842 B2
(45) Date of Patent: Jan. 13, 2026

(54) HERBICIDAL COMPOSITION, PREPARATION AND APPLICATION THEREOF

(71) Applicant: NANTONG JIANGSHAN AGROCHEMICAL & CHEMICALS CO., LTD, Nantong (CN)

(72) Inventors: Lei Dong, Nantong (CN); Hui Du, Nantong (CN); Yanmei Zhu, Nantong (CN); Meiyun Fan, Nantong (CN)

(73) Assignee: NANTONG JIANGSHAN AGROCHEMICAL & CHEMICALS CO., LTD., Nantong (CN)

(*) Notice: Subject to any disclaimer, the term of this patent is extended or adjusted under 35 U.S.C. 154(b) by 364 days.

(21) Appl. No.: 18/228,687

(22) Filed: Aug. 1, 2023

(65) Prior Publication Data

US 2023/0371509 A1    Nov. 23, 2023

Related U.S. Application Data

(63) Continuation of application No. PCT/CN2022/075776, filed on Feb. 10, 2022.

(51) Int. Cl.
| | |
|---|---|
| *A01N 37/26* | (2006.01) |
| *A01N 25/04* | (2006.01) |
| *A01N 37/22* | (2006.01) |
| *A01N 43/80* | (2006.01) |
| *A01N 47/36* | (2006.01) |
| *A01P 13/00* | (2006.01) |

(52) U.S. Cl.
CPC ............ *A01N 37/26* (2013.01); *A01N 25/04* (2013.01); *A01N 37/22* (2013.01); *A01N 43/80* (2013.01); *A01N 47/36* (2013.01); *A01P 13/00* (2021.08)

(58) Field of Classification Search
CPC ........ A01N 37/26; A01N 25/04; A01N 37/22; A01N 43/80; A01N 47/36; A01N 43/653; A01N 41/10; A01N 43/10; A01N 43/707; A01N 2300/00; A01N 43/70; A01P 13/00
See application file for complete search history.

(56) References Cited

FOREIGN PATENT DOCUMENTS

| CN | 109287639 A | * | 2/2019 |
| CN | 112335668 A | * | 2/2021 |

* cited by examiner

*Primary Examiner* — Robert A Wax
*Assistant Examiner* — Kimberly Barber
(74) *Attorney, Agent, or Firm* — Jose Cherson Weissbrot

(57) ABSTRACT

The invention relates to the technical field of pesticides, in particular to a herbicidal composition, preparation and application thereof. The herbicidal composition comprises a component A and a component B, wherein, the component A is benzylazole, and the component B is at least one of acetochlor, butachlor, metolachlo, dimethylphenoxychlor, mesotrione, nicosulfuron, atrazine, terbuthylazine, metribuzin, S-metolachlor and dimethylphenoxychlor. The weight ratio of the component A to the component B is 1:(1-80).

10 Claims, No Drawings

HERBICIDAL COMPOSITION, PREPARATION AND APPLICATION THEREOF

CROSS-REFERENCE TO RELATED APPLICATIONS

The present application is a continuation of International Application No. PCT/CN2022/075776, with an international filing date of Feb. 10, 2022, which is based upon and claims priority to Chinese Patent Application No. 202110714814.1, filed on Jun. 26, 2021, the entire contents thereof are incorporated herein by reference.

TECHNICAL FIELD

The invention relates to the technical field of pesticides, in particular to a herbicidal composition, preparation and application thereof.

BACKGROUND

Herbicides are essential in the management of farmland crops. Patent application (CN105052931A) prepares a synergistic water emulsion for weeding, which comprises an effective herbicidal component, an environmental solvent, a surfactant, a synergist, a stabilizer, an antifreeze agent and water, and is friendly to the environment and easy to degrade. However, a single effective herbicidal ingredient is easy to cause resistance, and its weeding varieties are not wide enough. At the same time, the synergistic water emulsion is extremely unstable under high and low temperatures, limiting the application.

In view of the above technical problems, the invention provides a herbicidal composition containing benzylazole and a water emulsion prepared by the herbicidal composition. With suitable additives, the invention solves the stability problem of the current water emulsion and expands the application range of the water emulsion.

SUMMARY

To solve the technical problem above, the invention provides a herbicidal composition which comprises a component A and a component B, wherein, the component A is benzylazole, and the component B is at least one of acetochlor, butachlor, metolachlo, dimethylphenoxychlor, mesotrione, nicosulfuron, atrazine nicosulfuron, terbuthylazine, metribuzin, S-metolachlor and dimethylphenoxychlor. The weight ratio of the component A to the component B is 1:(1-80).

In a preferred embodiment, when the component B is at least one of acetochlor, butachlor, metolachlor, dimethylphenoxychlor, S-metolachlor and dimethylphenoxychlor, the weight ratio of the component A to the component B is 1:(20-60).

In a preferred embodiment, when the component B is at least one of mesotrione and nicosulfuron, the weight ratio of the component A to the component B is 1:(1-10).

In a preferred embodiment, when the component B is at least one of atrazine nicosulfuron, terbuthylazine and metribuzin, the weight ratio of the component A to the component B is 1:(1-50).

The inventor finds that after benzylazole is mixed with the active component of component B in a certain proportion, there is no cross resistance due to the unique action mechanisms of the two effective components, resulting in synergistic effect, which expands the weed killing spectrum, improves the control effect, and makes up for the defect of poor control effect of the single agent on main weeds. At the same time, it also improves the persistence of each component of the composition, delays the occurrence of weed resistance, reduces the use times of pesticides as well as the consumption amount and cost, thus, it can be widely used in dry crops.

The invention also provides a herbicidal composition preparation, which is composed of the herbicidal composition and pesticide science acceptable excipients.

In a preferred embodiment, the dosage form of the herbicidal composition preparation is one of emulsion, water emulsion, microemulsion, dispersible oil suspension, suspension emulsion, microcapsule suspension-water emulsion, wettable powder and water dispersible granule.

In a more preferable embodiment, the herbicidal composition accounts for 1 to 90% of the weight of the herbicidal composition preparation.

In a more preferable embodiment, the dosage form of the herbicidal composition preparation is water emulsion. The pesticide science acceptable excipients include at least one of solvent, emulsifier, thickener, antifreeze agent, defoaming agent, density regulator and pH regulator.

In the invention, the raw materials for preparing the water emulsion comprises at least the following components by weight percentage: herbicidal composition 1-60%, emulsifier 2-10%, thickener 1-5%, antifreeze agent 0.5-3%, and solvent (the residual percentage).

Emulsifier

Emulsifier is a compound which makes the mixture liquid containing two or more immiscible components form a stable emulsion. The function principle of emulsifier is as follows: in emulsification, the dispersed phase is dispersed in the continuous phase in the form of micro droplets (micron level). The emulsifier reduces the interfacial tension of each component in the mixed system, and forms a relatively solid film on the surface of the micro droplets, or due to the charges given by the emulsifier, an electric double layer is formed on the surface of the micro droplets, so as to prevent the micro droplets from aggregating and maintain the uniformity of the emulsion. From the point of view of phases, the emulsion is still a heterogeneous system. Most of the dispersed phases in the emulsion are oil phase and a few are water phase. Most of the continuous phases are water phase, and a few are oil phase. The emulsifier is a surfactant with hydrophilic groups and oleophilic groups in its molecules. Generally, the hydrophile lipophilic balance value (HLB value) is used to indicate the hydrophilicity or lipophilicity of the emulsifier. The lower the HLB value, the higher the lipophilicity, and on the contrary, the higher the HLB value, the higher the hydrophilicity. The HLB values of different emulsifiers are different. An appropriate emulsifier must be selected in order to obtain stable emulsion.

In the invention, the emulsifier is at least one of alkyl phenol polyoxyethylene ether, phenylethyl phenol polyoxyethylene polyoxypropylene ether, polyoxyethylene sorbitan monolaurate, polyoxyethylene sorbitan monopalmitate, polyoxyethylene sorbitan monostearate, sorbitan monooleate, sorbitan laurate, sorbitan monopalmitate, sorbitan stearate, castor oil polyoxyethylene ether, alkylbenzene sulfonate, alkyl naphthalene sulfonate and alkyl sulfonate.

In a preferred embodiment, the emulsifier is the combination of castor oil polyoxyethylene ether, dehydrated sorbitol monopalmitate and sodium dodecylbenzene sulfonate at the weight ratio of (10-20):(1-5):1.

In a more preferred embodiment, the emulsifier is the combination of castor oil polyoxyethylene ether, sorbitan monopalmitate and sodium dodecylbenzene sulfonate at the weight ratio of 16:3:1.

In the invention, the HLB value of the castor oil polyoxyethylene ether is 11-16.

In a more preferred embodiment, the HLB value of the castor oil polyoxyethylene ether is 13-14.

In the invention, the castor oil polyoxyethylene ether is sourced from Jiahua Chemical Co., Ltd. with the models of EL-30, EL-40, HEL-40, EL-60, etc., but the source is not limited.

In the invention, the sorbitan monopalmitate is sourced from Jiangsu Hai'an Petrochemical Plant with the model of S-40, but the source is not limited.

In the invention, the sodium dodecylbenzene sulfonate is sourced from Langfang Pengcai Fine Chemical Co., Ltd. can be mentioned, but the source is not limited.

The water emulsion belongs to the O/W emulsion system, which is a multiphase system with thermodynamic instability and kinetic stability. The invention improves its physical stability in heat storage and low-temperature storage stability by optimizing and compounding the water emulsion. The inventor thinks the possible reason is that the system adopts the compounding of castor oil polyoxyethylene ether, sorbitan monopalmitate and sodium dodecylbenzene sulfonate, and the emulsifier molecules are closely arranged on the oil-water interface film, which increases the film strength and the stability of the emulsion, especially the effect is the best when the weight ratio of the three is (10-20):(1-5):1. Increasing the content of sorbitol monopalmitate will reduce the HLB value of the mixture emulsifier and deteriorate the heat storage stability of the water emulsion. The reason is that benzylazole melts into liquid at high temperature, which enhances the aggregation trend. At the same time, when the emulsifier is distributed at the oil-water interface, the proportion of lipophilic emulsifier increases, and the pull from the oil phase is greater than that from the water phase. When the droplets collide, the emulsifier molecules are easy to be squeezed into the oil phase, decreasing the strength of the interface film, and resulting in the accumulation of droplets and the clear oil layer. In addition, the inventor also finds that the stability of water emulsion diluent is improved by compounding a certain amount of sodium dodecylbenzene sulfonate in this system. The reason is that the high content of castor oil polyoxyethylene ether which is an emulsifier with strong hydrophilicity in this system will increase the solubility of organic solvents in water when the mixture emulsifier has high hydrophilicity, resulting in the precipitation of original drug crystals. Compounding a small amount of sodium dodecylbenzene sulfonate can not only reduce the solubility of solvent in water, but also enhance the stability of the emulsion to a certain extent, but excessive addition will reduce the heat storage stability of the water emulsion.

Thickener

Thickener, also known as gelling agent, is a substance that increases the viscosity of latex and liquid. It is also called paste when used in food. The thickener improves system viscosity, keeps the system in a uniform and stable suspension or emulsion state or form a gel. Most thickeners can emulsify. Thickeners are divided into a natural type and a synthetic type. Most natural thickeners are made from plants and seaweeds containing polysaccharide viscous substances, such as starch, arabic gum, pectin, agar, gelatin, seaweed gum, carrageenan, dextrin, etc. General gelatin, soluble starch, polysaccharide derivatives, etc., can be used in cosmetics. The synthetic materials include carboxymethyl cellulose, propylene glycol alginate, methyl cellulose, sodium starch phosphate, sodium carboxymethyl cellulose, sodium alginate, casein, sodium polyacrylate, polyoxyethylene, polyvinylpyrrolidone, etc.

In the invention, the thickener is not specially limited, and can be xanthan gum, sodium hydroxymethyl cellulose polyvinyl alcohol, magnesium aluminum silicate, sodium alginate, guar gum, gelatin, etc.

In a preferred embodiment, the thickener is polyvinyl alcohol.

The inventor thinks that adding a certain amount of polyvinyl alcohol as the thickener in the system has the following advantages: on the one hand, polyvinyl alcohol molecules are arranged in series around the surfactant micelles to form a mixed film of surfactants, which enhances the film strength and reduces the tension of the oil and water interface, thus further improving the stability of the emulsion; and on the other hand, the viscosity of the water emulsion is increased, the stratification rate is reduced, and the physical stability of the emulsion at room temperature is enhanced because the greater the viscosity of the system, the greater the viscosity resistance of the droplets moving in the continuous phase, resulting in the decrease of the moving speed, the decrease of the diffusion coefficient, the decrease of the stratification, flocculation and aggregation speeds of the emulsion, and the increase of the stability. However, too much thickener deteriorates the fluidity of the water emulsion, leading to unqualified dumping index of the product, which affects the use.

Antifreeze Agent

Antifreeze agent is a substance added to other liquids (generally water) to reduce the freezing point and improve the antifreeze ability. Antifreeze agent can also dissolve ice crystals and prevent ice crystals from growing. Antifreeze agent is mainly used in the internal combustion engine refrigeration system, air conditioning system, solar energy system, snow dissolving system, freeze drying, etc.

In the invention, the antifreeze agent is not specially limited and can be ethylene glycol, propylene glycol, glycerol, hexanediol, urea, ammonium sulfate, etc.

Solvent

In the invention, the solvent is a combination of organic solvent and water.

In a preferred embodiment, the weight ratio of the organic solvent to emulsifier is (2-5):1.

In a more preferred embodiment, the weight ratio of the organic solvent to emulsifier is 3:1.

In the invention, the organic solvent is at least one of hydrocarbon solvent, ketone solvent, ester solvent, alcohol solvent and aromatic solvent.

In a preferred embodiment, the organic solvent is an aromatic solvent.

In a more preferred embodiment, the aromatic solvent is toluene, o-xylene, 150 #solvent oil, etc.

In a more preferred embodiment, the aromatic solvent is 150 #solvent oil.

The inventor finds that the water emulsion prepared with the weight ratio of solvent to emulsifier as (2-5):1 has dense droplet distribution and increased system viscosity, because the resistance to the movement of small droplets increases, and the amount of emulsifier is enough to form a dense interface film on the oil-water interface of small droplets. Therefore, small droplets are not easy to polymerize and demulsify, which enhances emulsion stability. However, too much solvent causes the phase transition of the emulsion.

The inventor also finds that when the lipophilic group of the emulsifier contains double bonds and the content of hydrophilic polyoxyethylene chain is within a reasonable range, the oil separation rate of the water emulsion decreases. The possible reason is that aromatic solvents contain double bonds. When the lipophilic group of emulsifier introduces the double bonds, the force between the lipophilic group and oil molecules is enhanced. Under the shear pull effect of liquid film channeling flow, the lipophilic group and oil molecules have a relative displacement, which enhances the driving effect on oil molecules, proven by the increase of interfacial viscosity. Similarly, the lengthening of lipophilic group strengthens the force between adjacent oil molecules, enhances the interfacial viscosity, and improves the stability of the corresponding water emulsion system. When the polymerization number of polyoxyethylene in the hydrophilic group of the active agent increases, the oxygen group contained in the hydrophilic group is easy to hydrate, reducing the film stability. Moreover, polyoxyethylene is curly in water, and the area occupied by polyoxyethylene increases with the increase of polymerization degree, reducing film strength and the stability of the corresponding water emulsion system. Therefore, in this system, when aromatics are used as the solvent, castor oil polyoxyethylene ether, sorbitol monopalmitate and sodium dodecylbenzenesulfonate are used as compounded as the emulsifier, the stability of the prepared water emulsion is the best.

Water

In the invention, the water is deionized water, distilled water, purified water, etc.

The inventor thinks that the water used in this system cannot be tap water, because a variety of inorganic ions contained in tap water increase the density difference between the water phase and the oil phase, resulting in an increase in the centrifugal stratification rate.

In the invention, the preparation method of the water emulsion is as follows:
(1) Dissolve the herbicidal composition in an organic solvent, add an emulsifier and stir evenly to obtain an oil phase;
(2) Mix a thickener and an antifreeze agent with water to obtain a water phase;
(3) Slowly add the oil phase into the water phase under the condition of high-speed shear, and continue to shear for 20-60 min to obtain the water emulsion.

The invention also provides the application of the herbicidal composition in the pre-seedling soil treatment of dry crops.

The invention is described in detail below by embodiments. It is necessary to point out here that the following embodiments are only used to further describe the invention but cannot be understood to limit the protection scope of the invention. Any non-essential improvement or adjustment made by those skilled in the art according to the above content still falls within the protection scope of the invention.

Advantages

The invention provides a herbicidal composition and a water emulsion containing the herbicidal composition, which have the following advantages:

1. Benzylazole is compounded with acetochlor, butachlor, metolachlor, dimethylphenoxychlor, mesotrione, nicosulfuron, atrazine nicosulfuron, terbuthylazine, metribuzin, S-metolachlor and dimethylphenoxychlor. The unique action mechanism doesn't produce any cross resistance, but produces synergy, expands the weed killing spectrum, improves the control effect, and makes up for the poor control effect of the single agent on main weeds. In addition, the invention also improves the persistence of each component of the composition, delays the generation of weed resistance, reduces the use times of pesticides as well as the consumption amount and cost, and can be applied to the pre-seedling soil treatment of dry crops.

2. The emulsifier, solvent and other components and their contents are screened and optimized, so that the prepared water emulsion has stable quality and good performance, and is more conducive to drug efficacy. The water emulsion doesn't have any stratification, flocculation, coalescence or demulsification when stored at different temperatures, which greatly improves the storage stability of the water emulsion.

DETAILED DESCRIPTION OF EMBODIMENTS

Embodiment 1

Embodiment 1 provides a water emulsion of herbicial composition, which is prepared by the raw materials comprising the following components by weight percentage: herbicidal composition 51%, emulsifier 4%, thickener 2%, antifreeze agent 1%, organic solvent 12% and water (the residual percentage).

The herbicidal composition is a combination of benzylazole and acetochlor with a weight ratio of 1:50; the emulsifier is a combination of castor oil polyoxyethylene ether, sorbitol monopalmitate and sodium dodecylbenzene sulfonate with a weight ratio of 16:3:1; the castor oil polyoxyethylene ether is purchased from Jiahua Chemical Co., Ltd. with the model of EL-30; the sorbitol monopalmitate is purchased from Jiangsu Hai'an Petrochemical Plant with the model of S-40; the sodium dodecylbenzene sulfonate is purchased from Langfang Pengcai Fine Chemical Co., Ltd.; the thickener is polyvinyl alcohol; the antifreeze agent is glycerol; the organic solvent is 150 #solvent oil; and the water is deionized water.

The preparation method of the water emulsion is as follows:
(1) Dissolve the herbicidal composition in an organic solvent, add an emulsifier and stir evenly to obtain an oil phase;
(2) Mix a thickener and an antifreeze agent with water to obtain a water phase;
(3) Slowly add the oil phase into the water phase under the condition of high-speed shear, and continue to shear for 40 min to obtain the water emulsion.

Embodiment 2

Embodiment 2 provides a water emulsion of herbicial composition, which is prepared by the raw materials comprising the following components by weight percentage: herbicidal composition 30%, emulsifier 3%, thickener 1%, antifreeze agent 0.5%, organic solvent 15% and water (the residual percentage);

The herbicidal composition is a combination of benzylazole and S-metolachlor metolachlor with a weight ratio of 1:50; the emulsifier is a combination of castor oil polyoxyethylene ether, sorbitol monopalmitate and sodium dodecylbenzene sulfonate with a weight ratio of 10:1:1; the castor oil polyoxyethylene ether is purchased from Jiahua Chemical Co., Ltd. with the model of EL-30; the sorbitol monopalmitate is purchased from Jiangsu Hai'an Petrochemical Plant with the model of S-40; the sodium dodecylbenzene sulfonate is purchased from Langfang Pengcai Fine Chemical Co., Ltd.; the thickener is polyvinyl alcohol; the antifreeze agent is glycerol; the organic solvent is 150 #solvent oil; and the water is deionized water.

The preparation method of the water emulsion is as follows:
(1) Dissolve the herbicidal composition in an organic solvent, add an emulsifier and stir evenly to obtain an oil phase;
(2) Mix a thickener and an antifreeze agent with water to obtain a water phase;
(3) Slowly add the oil phase into the water phase under the condition of high-speed shear, and continue to shear for 40 min to obtain the water emulsion.

Embodiment 3

Embodiment 3 provides a water emulsion of herbicial composition, which is prepared by the raw materials comprising the following components by weight percentage: herbicidal composition 12%, emulsifier 8%, thickener 5%, antifreeze agent 3%, organic solvent 24% and water (the residual percentage);

The herbicidal composition is a combination of benzylazole and nicosulfuron with a weight ratio of 1:50; the emulsifier is a combination of castor oil polyoxyethylene ether, sorbitol monopalmitate and sodium dodecylbenzene sulfonate with a weight ratio of 20:5:1; the castor oil polyoxyethylene ether is purchased from Jiahua Chemical Co., Ltd. with the model of EL-30; the sorbitol monopalmitate is purchased from Jiangsu Hai'an Petrochemical Plant with the model of S-40; the sodium dodecylbenzene sulfonate is purchased from Langfang Pengcai Fine Chemical Co., Ltd.; the thickener is polyvinyl alcohol; the antifreeze agent is glycerol; the organic solvent is 150 #solvent oil; and the water is deionized water.

The preparation method of the water emulsion is as follows:
(1) Dissolve the herbicidal composition in an organic solvent, add an emulsifier and stir evenly to obtain an oil phase;
(2) Mix a thickener and an antifreeze agent with water to obtain a water phase;
(3) Slowly add the oil phase into the water phase under the condition of high-speed shear, and continue to shear for 40 min to obtain the water emulsion.

Embodiment 4

The difference between embodiment 4 and embodiment 1 is that the emulsifier does not include castor oil polyoxyethylene ether.

Embodiment 5

The difference between embodiment 5 and embodiment 1 is that the castor oil polyoxyethylene ether is replaced with nonylphenol polyoxyethylene ether which is purchased from Nantong Runfeng Petrochemical Co., Ltd.

Embodiment 6

The difference between embodiment 6 and embodiment 1 is that the emulsifier does not include sorbitol monopalmitate.

Embodiment 7

The difference between embodiment 7 and embodiment 1 is that the emulsifier does not include sodium dodecylbenzene sulfonate, Embodiment 8

The difference between embodiment 8 and embodiment 1 is that the thickener is xanthan gum.

Embodiment 9

The difference between embodiment 9 and embodiment 1 is that the solvent is dimethylformamide.

Embodiment 10

The difference between embodiment 10 and embodiment 1 is that the weight ratio of the solvent to emulsifier is 10:1.

Embodiment 11

The difference between embodiment 11 and embodiment 1 is that the herbicidal composition is the combination of benzylazole and acetochlor with a weight ratio of 1:30.

Performance Test

1. Heat storage stability test: put the water emulsion in the same well-sealed scale test tubes respectively with a plug, and then store them in a 54±0.1° C. water bath for 14 days; the acceptance criteria are as follows: the system is homogeneous and the water precipitation rate is less than 10%.

2. Cold store stability test: put the water emulsion in a scale test tube with a plug, then freeze it in the refrigerator at −18° C. for 24 h, then let it melt automatically under room temperature, and then put it in the refrigerator, and repeat this process for ten times; the acceptance criteria are as follows: no oil phase is separated out.

3. Determination of emulsification stability: dilute the water emulsion 200 times with 342 ppm standard hard water, put it in a constant temperature water bath at 30° C. for 1 h, and take it out; observe the separation of emulsion; the acceptance criteria are as follows: no oil slick on the top and no sediment on the bottom.

See Table 1 for the performance test results of the embodiments.

TABLE 1

Performance test results of the embodiments

| Embodiment | Heat storage stability | Cold Store stability | Emulsification stability |
|---|---|---|---|
| Embodiment 1 | Passed | Passed | Passed |
| Embodiment 2 | Passed | Passed | Passed |
| Embodiment 3 | Passed | Passed | Passed |
| Embodiment 4 | Failed | Failed | Failed |
| Embodiment 5 | Failed | Failed | Failed |
| Embodiment 6 | Failed | Failed | Failed |
| Embodiment 7 | Failed | Failed | Failed |
| Embodiment 8 | Failed | Failed | Failed |
| Embodiment 9 | Failed | Failed | Failed |
| Embodiment 10 | Failed | Failed | Failed |
| Embodiment 11 | Passed | Passed | Passed |

4. Control effect test:
Samples for test:
95% benzylazole technical, 81.5% acetochlor EC
Crop:
Corn: conventional varieties planted in large areas in the market (Tiegan 505, Kejujia 23)
Weeds:
Annual weeds such as piemarker, goosefoots, *Commelina communis*, *Amaranthus retroflexus*, *Solanum nigrum*, wild watermelon seedlings, purslane, *acalypha* copperleaf, *Xanthium sibiricum*, *Conyza canadensis*, *Eleusine indica*, *Eriochloa villosa*, green bristlegrass, *Echinochloa crusgalli*, *Alopecurus aequalis*, *Avena fatua*, *Poa annua*, giant foxtail, etc.

Application method:
Mixed with 45 kg of water per mu, sprayed to soil (apply the pesticide 24 h after corns and weed seeds were sown together)
Statistical analysis method of test results:
Calculation of $ED_{50}/ED_{90}$ value of test agent
Calculated with DPS statistical analysis software
Calculation of Co-toxicity coefficient:

$$\text{Co-toxicity coefficient} = \frac{1/ED_{50(90)} \text{ value of mixture agent}}{P_A/ED_{50(90)} \text{ value of agent } A + P_B/ED_{50(90)} \text{ value of agent } B} * 100$$

Wherein: $P_A$ is the proportion of agent A in the effective components of the mixture, $P_B$ is the proportion of agent B in the effective components of the mixture, and if the co-toxicity coefficient is less than 80, it is an antagonistic effect; if the co-toxicity coefficient is greater than 120, it is a synergistic effect; and if the co-toxicity coefficient is between 80-120, it is an additive effect.

The results are shown in Table 2, in which A is 95% benzylazole technical and B is 81.5% acetochlor EC.

The results are as follows: the test agents in Table 2 (percentage conversion) refer to those calculated by being converted into 100% benzylazole and 100% acetochlor, for example, when the weight ratio of 95% benzylazole technical to 81.5% acetochlor EC is 1:90, the value obtained by percentage conversion is 1:77.

Remarks: $ED_{50}$ is the activity test result of *Echinochloa crusgalli* after 15 days of treatment with different agents 5. Field efficacy test:
Test agent:

Embodiment 1 Water Emulsion of Herbicidal Composition

Control agent:
10% benzylazole water emulsion (Nantong Jiangshan Pesticide Chemical Co., Ltd.), 81.5% acetochlor emulsion (Nantong Jiangshan Pesticide Chemical Co., Ltd.)
Crops for test:
Corn (Suyunuo No. 11)
Controlled object:
Annual weeds (*Echinochloa*, *Eleusine indica*, purslane, *Eclipta prostrata*, *Acalypha* copperleaf, etc.)
Test method:
Cell division: the area of cells was 20 m$^2$, and the cells were arranged randomly, and each cell was treated for 3 times.
Usage: mixed with 45 kg of water per mu and sprayed evenly on the ground surface before corn sowing.
Methods of investigation, recording and measurement
Meteorological data: the weather on the test day was fine and breezy, and the temperature was normal and the efficacy was basically normal during the test.
Field management data: base fertilizer: 45%, compound fertilizer: 50 kg/mu. Other field management such as disease and insect prevention and topdressing were carried out according to normal management.
Weed investigation: the total weed control effect was visually investigated on the 7th, 10th, 15th, 30th and 45th days after application.
Investigation method: visual inspection.
Efficacy calculation method: the relative control effect percentage by visual inspection was recorded.
Crop investigation: visually observed the seedling emergence after corn sowing; the numbers of seedling emergence were investigated three times on the 4th, 7th and 12th days after sowing; and the growth of corn was observed on the 32nd and 47th days after sowing.
Investigation method: 20 seedlings for each treatment, and the safety degree of different doses on corn was observed.

TABLE 2

Summary of efficacy results of test agents with different proportions

| Test agent (percentage conversion) | $ED_{50}$ value (g a.i./hm$^2$) | A | B | A + B | $P_A$ | $P_B$ | Co-toxicity Coefficient | Mixture Result |
|---|---|---|---|---|---|---|---|---|
| A:B = 1:77 | 98.2 | 1 | 90 | 91 | 0.0110 | 0.9890 | 98 | + |
| A:B = 1:68 | 88.4 | 1 | 80 | 81 | 0.0123 | 0.9877 | 108 | + |
| A:B = 1:60 | 80.1 | 1 | 70 | 71 | 0.0141 | 0.9859 | 117 | + |
| A:B = 1:51 | 73.2 | 1 | 60 | 61 | 0.0164 | 0.9836 | 126 | ++ |
| A:B = 1:42 | 63.9 | 1 | 50 | 51 | 0.0196 | 0.9804 | 140 | ++ |
| A:B = 1:34 | 62.5 | 1 | 40 | 41 | 0.0244 | 0.9756 | 138 | ++ |
| A:B = 1:25 | 60.3 | 1 | 30 | 31 | 0.0323 | 0.9677 | 135 | ++ |
| A:B = 1:17 | 60 | 1 | 20 | 21 | 0.0476 | 0.9524 | 122 | ++ |
| A:B = 1:8 | 59 | 1 | 10 | 11 | 0.0909 | 0.9091 | 96 | + |
| A | 10 | | | | | | | |
| B | 106.7 | | | | | | | |

The investigation results of the efficacy of the insecticide against weeds are as follows:

TABLE 3

Summary of effectiveness investigation of embodiment 1 on weeds

| Treatment agent | Preparation consumption (ml/mu) | Effectiveness of annual weeds (%) | | | | |
|---|---|---|---|---|---|---|
| | | 7 days | 10 days | 15 days | 30 days | 45 days |
| Embodiment 1 Water emulsion of herbicidal composition | 150 | 100 | 100 | 98 | 93 | 90 |
| 10% benzylazole water emulsion | 30 | 97 | 97 | 93 | 85 | 45 |
| 81.5% acetochlor EC | 150 | 98 | 98 | 92 | 85 | 40 |
| Clear water for control | 0 | 15-20 seedlings/m² | 35-40 seedlings/m² | 350-550 seedlings/m² | 550-850 seedlings/m² | 850-1350 seedlings/m² |

The investigation results of the safety of the insecticide against crops are as follows:

TABLE 4

Summary of safety investigation of embodiment 1 on crops

| Treatment agent | Preparation consumption (ml/mu) | Number of emerging seedlings (%) (100 seeds) | | | Corn growth (compared with the control group) | |
|---|---|---|---|---|---|---|
| | | 4 d after application | 7 d after application | 12 d after application | 32 d after application | 47 d after application |
| Embodiment 1 Water emulsion of herbicidal composition | 150 | 95 | 94 | 94 | The seedlings grow normally | The seedlings grow normally |
| 10% benzylazole water emulsion | 30 | 94 | 90 | 89 | The seedlings grow normally | The seedlings grow normally |
| 81.5% acetochlor EC | 150 | 93 | 92 | 92 | The seedlings grow normally | The seedlings grow normally |
| Clear water Control | 0 | 93 | 92 | 91 | The seedlings grow normally | The seedlings grow normally |

The embodiments above are only illustrative and used to explain some features of the method described in the invention. The claims intend to claim the widest possible scope that can be envisaged, and the embodiments presented herein are only selected for illustration according to all possible combinations of embodiments. Therefore, it is the object of the applicant that the claims are not limited by the embodiments illustrating the features of the invention. Some numerical ranges used in the claims also include sub-ranges within them, and any changes in these ranges should also be covered by the claims where possible.

What is claimed is:

1. A herbicidal composition, wherein the composition comprises a component A and a component B, wherein, the component A is benzylazole, and the component B is at least one of acetochlor, butachlor, metolachlo, dimethylphenoxychlor, mesotrione, nicosulfuron, atrazine, terbuthylazine, metribuzin, S-metolachlor and dimethylphenoxychlor; the weight ratio of the component A to the component B is 1:(1-80).

2. A herbicidal composition preparation, comprising the herbicidal composition of claim 1 and excipients acceptable in pesticide science.

3. The herbicidal composition preparation of claim 2, wherein the dosage form of the herbicidal composition preparation is one of emulsion, water emulsion, microemulsion, dispersible oil suspension, suspension emulsion, microcapsule suspension-water emulsion, wettable powder and water dispersible granule.

4. The herbicidal composition preparation of claim 2, wherein the herbicidal composition accounts for 1 to 90% of the weight of the herbicidal composition preparation.

5. The herbicidal composition preparation of claim 2, wherein the dosage form of the herbicidal composition preparation is water emulsion; the excipients acceptable in pesticide science comprise at least one of solvent, emulsifier, thickener, antifreeze agent, defoaming agent, density regulator and pH regulator.

6. The herbicidal composition preparation of claim 5, wherein the emulsifier is at least one of alkyl phenol polyoxyethylene ether, phenylethyl phenol polyoxyethylene polyoxypropylene ether, polyoxyethylene sorbitan monolaurate, polyoxyethylene sorbitan monopalmitate, polyoxyethylene sorbitan monostearate, sorbitan monooleate, sorbitan laurate, sorbitan monopalmitate, sorbitan stearate, castor oil polyoxyethylene ether, alkylbenzene sulfonate, alkyl naphthalene sulfonate and alkyl sulfonate.

7. The herbicidal composition preparation of claim 6, wherein the emulsifier is the combination of castor oil polyoxyethylene ether, sorbitan monopalmitate and sodium dodecylbenzene sulfonate at the weight ratio of (10-20):(1-5):1.

8. The herbicidal composition preparation of claim 5, wherein the solvent is the combination of organic solvent and water, and the weight ratio of the organic solvent to the emulsifier is (2-5):1.

9. The herbicidal composition preparation of claim 8, wherein the organic solvent is at least one of hydrocarbon solvent, ketone solvent, ester solvent, alcohol solvent and aromatic solvent.

10. The application of the herbicidal composition preparation of claim 5, wherein it is applied to the pre-seedling soil treatment of dry crops.

\* \* \* \* \*